US009077984B2

(12) United States Patent
Yoshida et al.

(10) Patent No.: US 9,077,984 B2
(45) Date of Patent: Jul. 7, 2015

(54) CONTROL SYSTEM, CONTROL DEVICE, IMAGE SYSTEM, EYEGLASSES, AND IMAGE DISPLAY DEVICE

(75) Inventors: Takeshi Yoshida, Kyoto (JP); Yoichi Hasegawa, Kyoto (JP); Takashi Naiki, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 632 days.

(21) Appl. No.: 13/414,772

(22) Filed: Mar. 8, 2012

(65) Prior Publication Data

US 2012/0229613 A1 Sep. 13, 2012

(30) Foreign Application Priority Data

Mar. 8, 2011 (JP) ................................ 2011-050390

(51) Int. Cl.
*H04N 13/04* (2006.01)
*H04N 13/00* (2006.01)

(52) U.S. Cl.
CPC ....... *H04N 13/0472* (2013.01); *H04N 13/0022* (2013.01); *H04N 13/0431* (2013.01); *H04N 13/0454* (2013.01); *H04N 13/0479* (2013.01)

(58) Field of Classification Search
CPC .......... H04N 13/0479; H04N 13/0472; H04N 13/0454
USPC ............................................... 348/42, 43, 56
See application file for complete search history.

(56) References Cited

U.S. PATENT DOCUMENTS

| | | | | |
|---|---|---|---|---|
| 6,115,177 A * | 9/2000 | Vossler | ........................... | 359/465 |
| 6,791,599 B1 * | 9/2004 | Okada et al. | .................... | 348/56 |
| 8,370,873 B2 * | 2/2013 | Shintani | ........................... | 725/39 |
| 8,605,140 B2 * | 12/2013 | Chiba et al. | ...................... | 348/53 |
| 2004/0252756 A1 * | 12/2004 | Smith et al. | .............. | 375/240.01 |
| 2010/0085424 A1 * | 4/2010 | Kane et al. | ....................... | 348/53 |
| 2010/0157425 A1 * | 6/2010 | Oh | ............................... | 359/464 |
| 2011/0102555 A1 * | 5/2011 | Yasui | ............................... | 348/51 |
| 2011/0234586 A1 * | 9/2011 | Aoki | .............................. | 345/419 |
| 2011/0254936 A1 * | 10/2011 | MacNaughton et al. | ........ | 348/56 |
| 2011/0304472 A1 * | 12/2011 | Chou et al. | ..................... | 340/689 |
| 2012/0033145 A1 * | 2/2012 | Ko et al. | .......................... | 349/13 |
| 2012/0113235 A1 * | 5/2012 | Shintani | ........................... | 348/51 |
| 2012/0182613 A1 * | 7/2012 | Yoneno | ........................... | 359/465 |
| 2012/0262451 A1 * | 10/2012 | Kotani et al. | .................. | 345/419 |

FOREIGN PATENT DOCUMENTS

| | | |
|---|---|---|
| JP | 07-255068 | 10/1995 |
| JP | 11-084313 | * 3/1999 |
| JP | 2001-296501 | * 10/2001 |

OTHER PUBLICATIONS

Hoshino et al, Machine generated translation of JP 2001-296501, Oct. 2001.*

* cited by examiner

*Primary Examiner* — David Harvey
(74) *Attorney, Agent, or Firm* — Fish & Richardson P.C.

(57) ABSTRACT

Technology for controlling image display according to the state of a viewer wearing eyeglasses to view 3D images is provided. When an inclined angle of eyeglasses is in a predetermined range, an image display device alternately displays a left-eye image and a right-eye image. When the inclined angle of the eyeglasses exceeds the predetermined range, the image display device does not switch the left-eye image with the right-eye image. For example, the image display device displays 2D images. Optical shutters of the eyeglasses are synchronized with the left-eye image and the right-eye image. When the image display device does not switch the left-eye image with the right-eye image, the optical shutters are both open.

40 Claims, 16 Drawing Sheets

CONTROL SYSTEM, CONTROL DEVICE, IMAGE SYSTEM, EYEGLASSES, AND IMAGE DISPLAY DEVICE

BACKGROUND OF THE INVENTION

1. Field of the Invention

The invention relates to a technology for audio-visual purposes regarding 3D images displayed by an image display device through eyeglasses, and more particularly to a technology for controlling image display according to the state of a viewer.

2. Description of the Related Art

An image system is provided to enable viewers to view 3D images. In the image system, a left-eye image and a right-eye image are alternately or simultaneously displayed on an image display device. For example, Japanese Patent Publication No. 7-255068 (Patent Document 1) discloses that a viewer can wear eyeglasses for stereoscopic viewing to view 3D images displayed on the image display device. The eyeglasses are capable of respectively guiding the left-eye image and the right-eye image to the left eye and the right eye of the viewer.

Patent Document 1: Japanese Patent Publication No. 7-255068

SUMMARY OF THE INVENTION

Generally, an image system is designed to accommodate viewing when the eyeglasses remain in a substantially horizontal state. In practice, however, the physical position of the viewer relative to the image may not remain fixed.

For example, if the viewer is reclined, the eyeglasses may likely be inclined from horizontal. However, the conventional image system alternately displays the left-eye image and the right-eye image no matter whether the eyeglasses are inclined or not. That is, in the conventional image system, the relative posture of the viewer is not particularly considered, especially when this causes the eyeglasses to be inclined.

The invention is directed to provide a technology for controlling image display according to the posture of a viewer wearing eyeglasses to view 3D images.

In one aspect, the invention provides a control system, for controlling an image system. The image system includes an image display device for displaying 3D images containing a left-eye image and a right-eye image, and at least one pair of eyeglasses for viewing the 3D images. The image display device alternately displays the left-eye image and the right-eye image. The at least one pair of eyeglasses includes first and second optical shutters respectively disposed corresponding to the left-eye image and the right-eye image. The control system includes: a sensor, configured to detect an inclined angle of the at least one pair of eyeglasses with respect to a horizontal direction; a mode switching portion, configured to switch an action mode of the image display device from a first mode to a second mode when a detection result of the sensor indicates that the inclined angle exceeds a first range, wherein the first mode alternately displays the left-eye image and the right-eye image, and the second mode does not switch the left-eye image with the right-eye image; and an optical shutter adjusting portion, configured when in the first mode to respectively open and close the first and second optical shutters in synchronization with the display of the left-eye image and the right-eye image, and in the second mode, to open both the first and second optical shutters.

In another aspect, the invention provides a control device, installed in eyeglasses for viewing 3D images containing a left-eye image and a right-eye image displayed by an image display device. The image display device is configured to switch an action mode of the image display device from a first mode to a second mode when an inclined angle of the eyeglasses exceeds a specified range with respect to a horizontal direction. The first mode alternately displays the left-eye image and the right-eye image, and the second mode does not switch the left-eye image with the right-eye image. The eyeglasses include first and second optical shutters respectively disposed corresponding to the left-eye image and the right-eye image. The control device includes: a sensor, configured to detect the inclined angle of the eyeglasses; a transmitting portion, configured to transmit a first signal indicating the inclined angle detected by the sensor to the image display device; a receiving portion, configured to receive from the image display device a specific second signal of the action mode selected by the image display device; and an optical shutter adjusting portion, configured to adjust the first and second optical shutters in response to the second signal received by the receiving portion. The optical shutter adjusting portion is configured when in the first mode to respectively open and close the first and second optical shutters in synchronization with the display of the left-eye image and the right-eye image, and in the second mode, to open both the first and second optical shutters.

In another aspect, the invention provides a control device, installed in eyeglasses for viewing 3D images containing a left-eye image and a right-eye image displayed by an image display device. The image display device is configured to switch an action mode of the image display device from a first mode to a second mode when an inclined angle of the eyeglasses exceeds a specified range with respect to a horizontal direction. The first mode alternately displays the left-eye image and the right-eye image. The second mode does not switch the left-eye image with the right-eye image. The eyeglasses include first and second optical shutters respectively disposed corresponding to the left-eye image and the right-eye image. The control device includes: a sensor, configured to detect the inclined angle of the eyeglasses; a determining portion, configured to determine whether the inclined angle detected by the sensor is in the specified range; a transmitting portion, configured to transmit a first signal indicating a determination result of the determining portion to the image display device; a receiving portion, configured to receive from the image display device a specific second signal of the action mode selected by the image display device; and an optical shutter adjusting portion, configured to adjust the first and second optical shutters in response to the second signal received by the receiving portion. The optical shutter adjusting portion is configured when in the first mode to respectively open and close the first and second optical shutters in synchronization with the display of the left-eye image and the right-eye image, and in the second mode, to open both the first and second optical shutters.

In another aspect, the invention provides a control device, installed in an image display device for displaying 3D images containing a left-eye image and a right-eye image. The control device includes: a receiving portion, configured to receive an angle signal from at least one pair of eyeglasses for viewing the 3D images. The angle signal indicates an inclined angle of the at least one pair of eyeglasses with respect to a horizontal direction. The at least one pair of eyeglasses includes first and second optical shutters respectively disposed corresponding to the left-eye image and the right-eye image. The first and second optical shutters are respectively configured to be synchronized with the display of the corresponding images. The control device further includes: a mode switching portion, configured to switch an action mode of the image display device from a first mode to a second mode when the inclined angle exceeds a first range. The first mode alternately displays the left-eye image and the right-eye image. The second mode does not switch the left-eye image with the right-eye image. The control device further includes: a transmitting portion, configured when in the first mode to transmit a first signal synchronized with the display of the left-eye image and the right-eye image to the eyeglasses, and in the second mode, transmit a second signal setting both the first and second optical shutters to be open to the eyeglasses.

In another aspect, the invention provides an image system, including an image display device. The image display device includes: a display portion, configured to display images; and a mode switching portion, configured to switch a display mode of the display portion from a first mode to a second mode. The first mode alternately displays a left-eye image and a right-eye image. The second mode does not switch the left-eye image with the right-eye image. The image display device further includes: a first transmitting portion, configured when in the first mode to output a first signal synchronized with the display of the left-eye image and the right-eye image, and in the second mode, output a second signal indicating the second mode. The image system further includes eyeglasses. The eyeglasses include: first and second optical shutters, respectively disposed corresponding to the left-eye image and the right-eye image; a sensor, configured to detect an inclined angle of the eyeglasses with respect to a horizontal direction, a second transmitting portion, configured when the inclined angle detected by the sensor exceeds a specified range to transmit to the image display device a signal that enables the mode switching portion to switch the display mode from the first mode to the second mode; and an optical shutter adjusting portion. The optical shutter adjusting portion is configured to respectively open and close the first and second optical shutters in synchronization with the display of the left-eye image and the right-eye image in response to the first signal, and open both the first and second optical shutters in response to the second signal.

In another aspect, the invention provides eyeglasses, for viewing 3D images containing a left-eye image and a right-eye image displayed by an image display device. The image display device is configured to switch an action mode of the image display device from a first mode to a second mode when an inclined angle of the eyeglasses exceeds a specified range with respect to a horizontal direction. The first mode alternately displays the left-eye image and the right-eye image. The second mode does not switch the left-eye image with the right-eye image. The eyeglasses include: first and second optical shutters, respectively disposed corresponding to the left-eye image and the right-eye image; and a control portion, configured to control the first and second optical shutters. The control portion includes: a sensor, configured to detect the inclined angle of the eyeglasses; a transmitting portion, configured to transmit a first signal indicating the inclined angle detected by the sensor to the image display device; a receiving portion, configured to receive from the image display device a specific second signal of the action mode selected by the image display device; and an optical shutter adjusting portion, configured to adjust the first and second optical shutters in response to the second signal received by the receiving portion. The optical shutter adjusting portion is configured when in the first mode to respectively open and close the first and second optical shutters in synchronization with the display of the left-eye image and the right-eye image, and in the second mode, to open both the first and second optical shutters.

In another aspect, the invention provides eyeglasses, for viewing 3D images containing a left-eye image and a right-eye image displayed by an image display device. The image display device is configured to switch an action mode of the image display device from a first mode to a second mode when an inclined angle of the eyeglasses exceeds a specified range with respect to a horizontal direction. The first mode alternately displays the left-eye image and the right-eye image. The second mode does not switch the left-eye image with the right-eye image. The eyeglasses include: first and second optical shutters, respectively disposed corresponding to the left-eye image and the right-eye image; and a control portion, configured to control the first and second optical shutters. The control portion includes: a sensor, configured to detect the inclined angle of the eyeglasses; a determining portion, configured to determine whether the inclined angle detected by the sensor is in the specified range; a transmitting portion, configured to transmit a first signal indicating a determination result of the determining portion to the image display device; a receiving portion, configured to receive from the image display device a specific second signal of the action mode selected by the image display device; and an optical shutter adjusting portion, configured to adjust the first and second optical shutters in response to the second signal received by the receiving portion. The optical shutter adjusting portion is configured when in the first mode to respectively open and close the first and second optical shutters in synchronization with the display of the left-eye image and the right-eye image, and in the second mode, to open both the first and second optical shutters.

In another aspect, the invention provides an image display device, including: a display portion, configured to alternately display a left-eye image and a right-eye image; and a mode switching portion, configured to switch a display mode of the display portion from a first mode to a second mode when an inclined angle of eyeglasses for viewing the left-eye image and the right-eye image exceeds a specified range with respect to a horizontal direction. The first mode alternately displays the left-eye image and the right-eye image. The second mode does not switch the left-eye image with the right-eye image. The eyeglasses include first and second optical shutters respectively disposed corresponding to the left-eye image and the right-eye image, and the first and second optical shutters are respectively configured to be synchronized with the display of the corresponding images. The image display device further includes: a transmitting portion, configured when in the first mode to transmit a first signal synchronized with the display of the left-eye image and the right-eye image to the eyeglasses, and in the second mode, transmit a second signal indicating the second mode to the eyeglasses.

Effect of the Invention

The invention allows viewing of 3D images without discomfort.

DETAILED DESCRIPTION OF THE INVENTION

Figure 1:
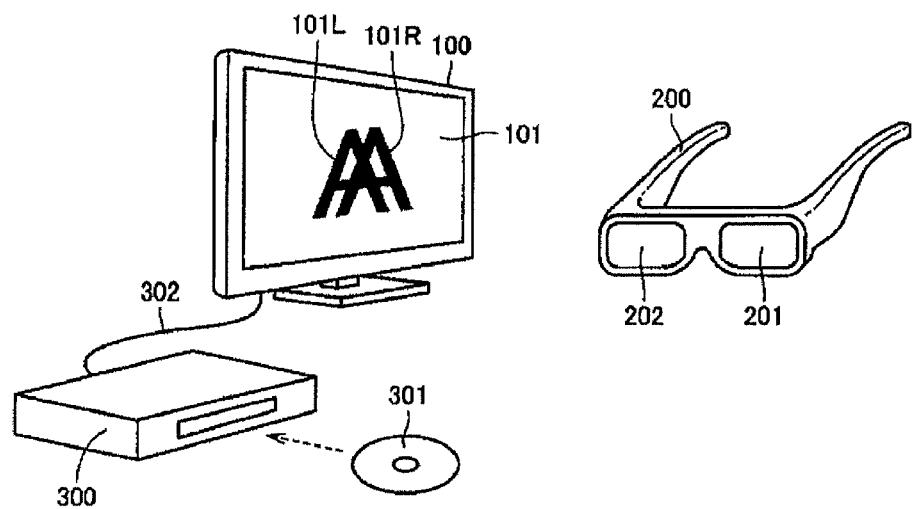
FIG. 1 is a schematic diagram of an example illustrating the configuration of an image system according to Embodiment 1 of the invention.

Embodiments of the invention are illustrated in detail below with the accompanying drawings. Identical or equivalent parts are marked by the same reference numerals, description of which will not be repeated herein.

[Embodiment 1]

FIG. 1 is a schematic diagram of an example illustrating the configuration of an image system according to Embodiment 1 of the invention. Referring to FIG. 1, the image system in Embodiment 1 includes an image display device 100, eyeglasses 200, and a disc regeneration device 300.

The image display device 100 includes a display panel 101 for displaying images. The display panel 101 alternately displays a left-eye image 101L and a right-eye image 101R according to a specified cycle (for example, 120 Hz). The cycle can be 120 Hz, for example, but is not limited thereto.

The eyeglasses 200 are used to enable a person (not shown in the drawings) to view the left-eye image 101L and the right-eye image 101R as 3D pictures. The eyeglasses 200 include optical shutters 201, 202 respectively corresponding to the left-eye image 101L and the right-eye image 101R. The optical shutters 201, 202 each have an open state and a closed state. The "closed state" refers to a state in which the amount of light passing through the optical shutter is smaller than that in the "open state." Therefore, in the invention, the "closed state" can include a (light blocking) state in which the optical shutter blocks the light, and a (light weakening) state in which the optical shutter weakens the light. The viewer alternately views the left-eye image 101L and the right-eye image 101R through the optical shutters 201, 202. In this way, the viewer can view the images displayed by the image display device 100 as 3D images.

The optical shutters 201, 202 can also be optical filters capable of changing a polarization direction. That is, an optical element capable of adjusting the amount of light passing through in synchronization with the left-eye image and the right-eye image can be applied to the optical shutters 201, 202.

A disc 301 is a recording medium for recording information of the left-eye image and the right-eye image. The disc regeneration device 300 reads the information of the left-eye image and the right-eye image recorded in the disc 301, and outputs an image signal through a cable 302 to the image display device 100. The image display device 100 displays the left-eye image 101L and the right-eye image 101R according to the image signal transmitted by the disc regeneration device 300. According to the configuration of the system in FIG. 1, the disc regeneration device 300 is separated from the image display device 100. However, the disc regeneration device 300 can also be integrally formed with the image display device 100.

FIG. 1 further shows the configuration for regenerating the image recorded in the disc. The image display device 100 can also receive a broadcast signal including data of the left-eye image and the right-eye image, and process the broadcast signal to display the left-eye image and the right-eye image.

Figure 2:
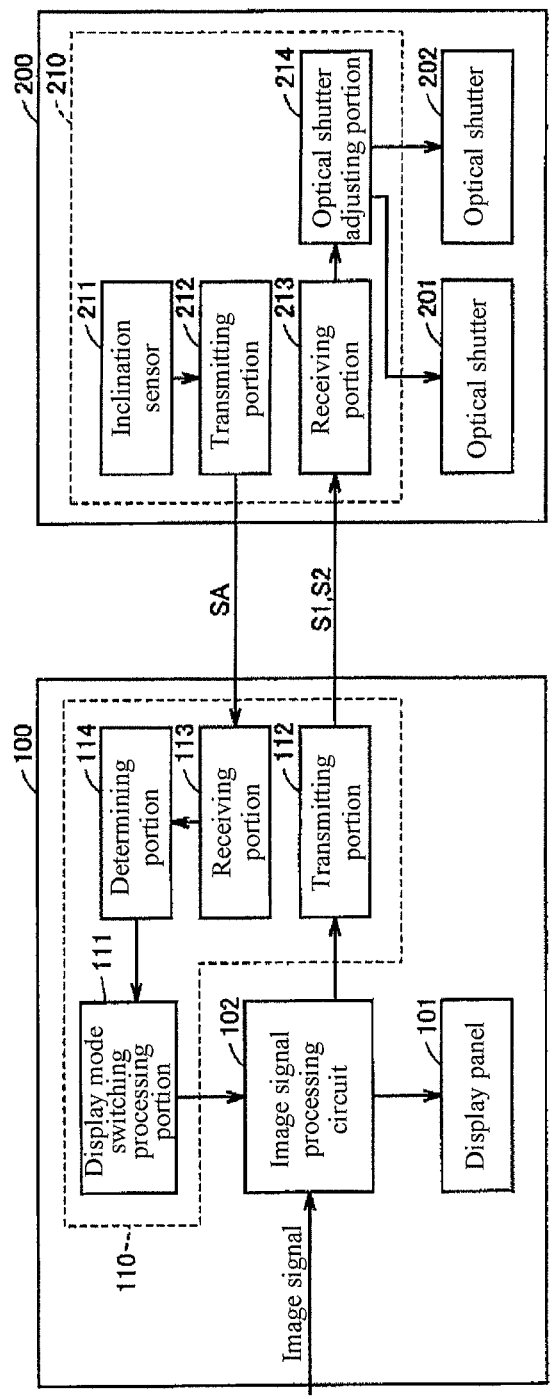
FIG. 2 is a block diagram of an example illustrating the configuration of an image display device 100 and eyeglasses 200 in FIG. 1.

FIG. 2 is a block diagram of an example illustrating the configuration of the image display device 100 and the eyeglasses 200 in FIG. 1. Referring to FIG. 2, the image display device 100 includes a display panel 101, an image signal processing circuit 102, and a control circuit 110. The control circuit 110 includes a display mode switching processing portion 111, a transmitting portion 112, a receiving portion 113, and a determining portion 114.

The image signal processing circuit 102, for example, receives the image signal from the disc regeneration device 300 in FIG. 1, and processes the image signal. The display panel 101 receives the signal output by the image signal processing circuit 102, and displays the image generated by the image signal processing circuit 102.

The image display device 100 has a first mode and a second mode. In the first mode, the image display device 100 displays the left-eye image and the right-eye image. In this case, the image signal processing circuit 102 detects the left-eye image and the right-eye image from the image signal, and alternately arranges the detected images by time. Alternatively, the image signal processing circuit 102 generates the left-eye image and the right-eye image from the image signal for displaying 2D images. The display panel 101 alternately displays the left-eye image and the right-eye image by time.

The image signal processing circuit 102 generates the left-eye image and the right-eye image, and generates a synchronizing signal S1 in synchronization with the left-eye image and the right-eye image. The image signal processing circuit 102 outputs the synchronizing signal S1 to the transmitting portion 112.

In another aspect, in the second mode, the image display device 100 displays 2D images. In the case that the image signal includes signals of the left-eye image and the right-eye image, the image signal processing circuit 102, for example, generates 2D images according to the left-eye image and the right-eye image. The image signal processing circuit 102 can also select either the left-eye image or the right-eye image as a 2D image. The image signal processing circuit 102 generates 2D images and generates a mode signal S2 indicating the second mode. The image signal processing circuit 102 outputs the mode signal S2 to the transmitting portion 112.

The transmitting portion 112 outputs the signal transmitted by the image signal processing circuit 102, that is, the synchronizing signal S1 or the mode signal S2. For example, the transmitting portion 112 outputs the signal using infrared rays. The signal transmitted by the transmitting portion 112 is received by the eyeglasses 200.

The receiving portion 113 receives an angle signal SA from the eyeglasses 200. The angle signal SA, for example, is transmitted from the eyeglasses 200 using infrared rays. The angle signal SA transmitted from the eyeglasses 200 indicates an inclined angle of the eyeglasses 200 with respect to a horizontal direction. The inclined angle of the eyeglasses 200 with respect to the horizontal direction is subsequently referred to herein as an "inclined angle."

The determining portion 114 determines whether the inclined angle of the eyeglasses 200 is in a predetermined range according to the angle signal SA received by the receiving portion 113. The determining portion 114 outputs a determination result to the display mode switching processing portion 111.

The display mode switching processing portion 111 switches a display mode of the image display device 100 between the first mode and the second mode. Specifically, when the inclined angle of the eyeglasses 200 is in the predetermined range, the display mode switching processing portion 111 selects the first mode, and transmits a signal indicating the first mode to the image signal processing circuit 102. In another aspect, when the inclined angle of the eyeglasses 200 is outside the predetermined range, the display mode switching processing portion 111 selects the second mode, and transmits a signal indicating the second mode to the image signal processing circuit 102. The processing of the image signal processing circuit 102 in the first mode and the second mode will not be repeatedly described herein.

The eyeglasses 200 include optical shutters 201, 202 and a control circuit 210. The control circuit 210 includes an inclination sensor 211, a transmitting portion 212, a receiving portion 213, and an optical shutter adjusting portion 214. The control circuit 210, for example, is accommodated in the frame of the eyeglasses 200.

The optical shutters 201, 202 are respectively disposed corresponding to positions of the left and right eyes of the eyeglasses 200. The optical shutters 201, 202 respectively adjust the amount of light passing through in response to the signal from the optical shutter adjusting portion 214. For example, the optical shutters 201, 202 can be implemented as liquid crystal shutters. However, the optical shutters 201, 202 are not limited to liquid crystal shutters.

The inclination sensor 211 detects the inclined angle of the eyeglasses 200. The inclination sensor 211 outputs the angle signal SA indicating the inclined angle to the transmitting portion 212. The transmitting portion 212 outputs the angle signal SA. For example, the transmitting portion 112 outputs the signal using infrared rays. The signal output by the transmitting portion 212 is received by the receiving portion 113 of the image display device 100.

The receiving portion 213 receives the synchronizing signal S1 and the mode signal S2 transmitted by the transmitting portion 112 of the image display device 100. The optical shutter adjusting portion 214 switches the states of the optical shutters 201, 202 between open state and closed state according to the signal received by the receiving portion 213. Specifically, when the receiving portion 213 receives the synchronizing signal S1, the optical shutter adjusting portion 214 opens and closes the optical shutters 201, 202 in synchronization with the left-eye image and the right-eye image. In another aspect, when the receiving portion 213 receives the mode signal S2, the optical shutter adjusting portion 214 maintains the state of both optical shutters 201, 202 to be either open state or closed state. Specifically, the optical shutter adjusting portion 214 maintains the state of both optical shutters 201, 202 to be open state. That is, the mode signal S2 is a signal indicating that the optical shutter adjusting portion 214 sets the optical shutters 201, 202 to be open.

The control circuits 110, 210 each can be implemented using a single semiconductor integrated circuit (IC) or multiple semiconductor ICs.

If an inclined angle of an object from the horizontal direction is detected and a sensor outputs a signal indicating the inclined angle, various types of sensors are applicable to the inclination sensor 211.

Figure 3:
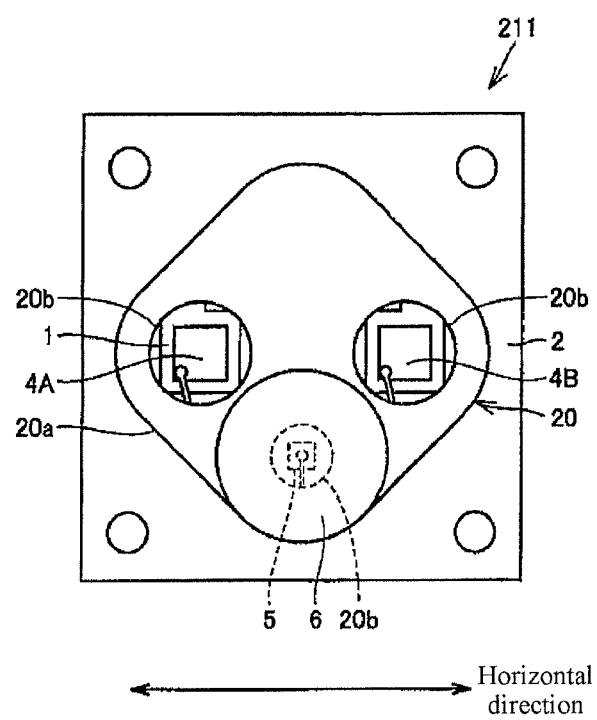
FIG. 3 is a diagram of an example for implementing an inclination sensor in FIG. 2.
Figure 4:
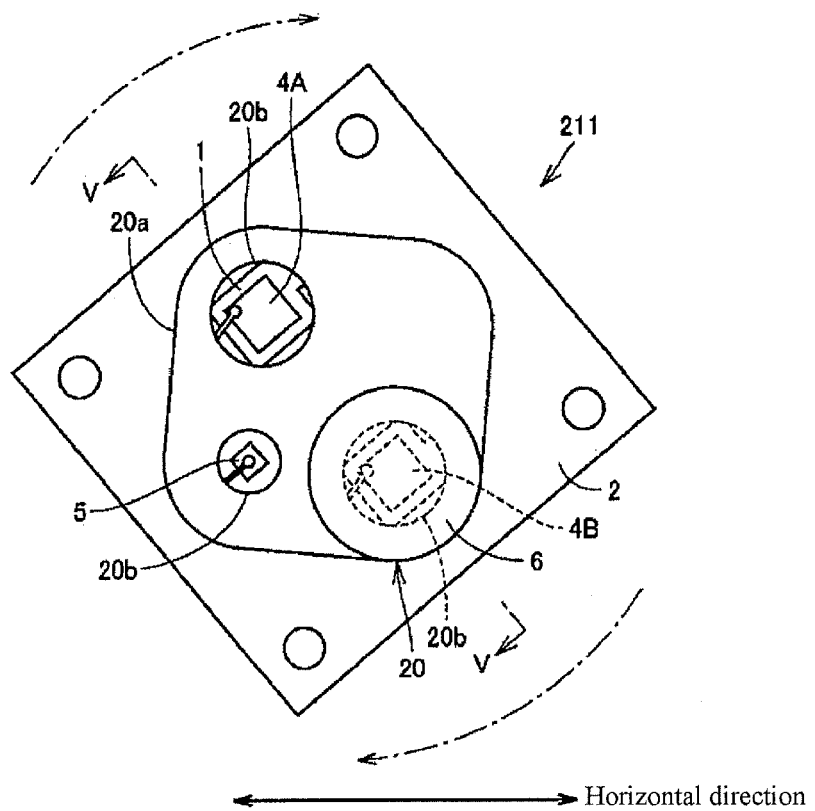
FIG. 4 is a diagram illustrating a state of the inclination sensor in FIG. 3 inclined in a forward rotation direction.
Figure 5:
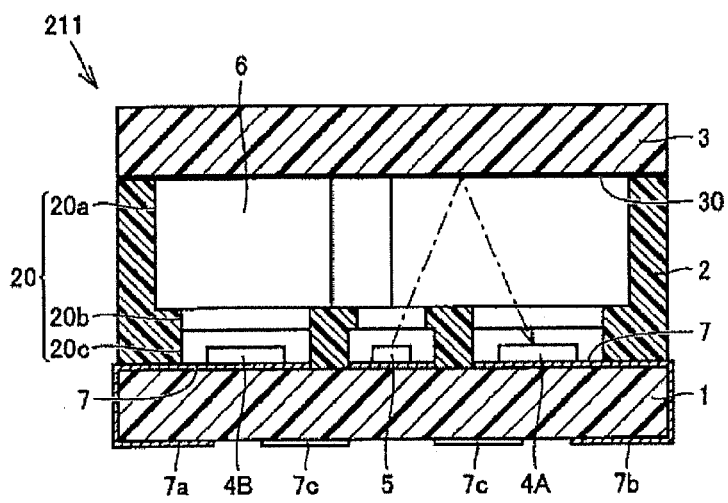
FIG. 5 is a schematic diagram of a V-V section in FIG. 4.
Figure 6:
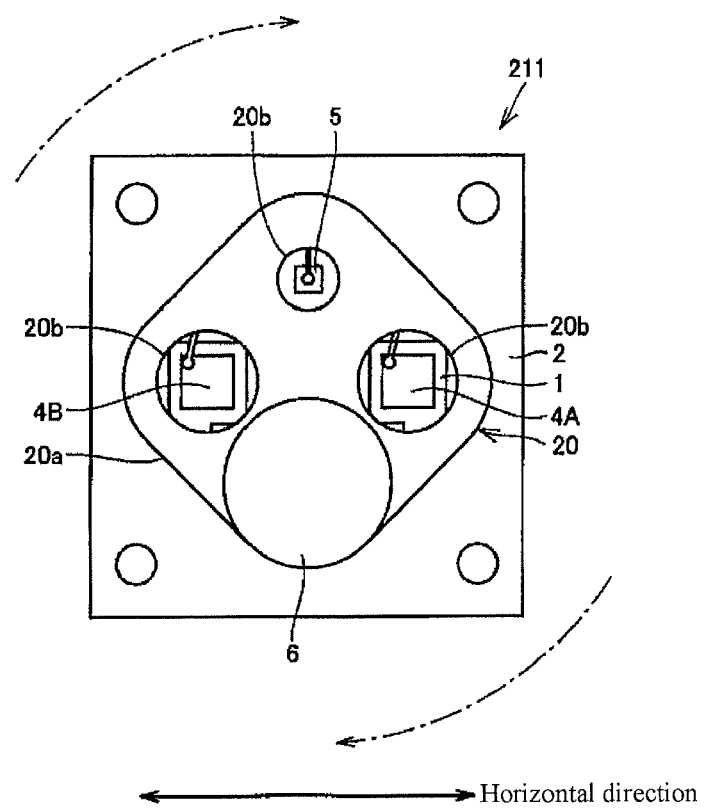
FIG. 6 is a front view of an inverted state of the inclination sensor in FIG. 3.

FIG. 3 is a diagram of an example of implementing the inclination sensor in FIG. 2. FIG. 4 is a diagram illustrating a state of the inclination sensor in FIG. 3 inclined in a forward rotation direction. FIG. 5 is a schematic diagram of a V-V section in FIG. 4. FIG. 6 is a front view of an inverted state of the inclination sensor in FIG. 3.

Referring to FIG. 3 to FIG. 6, the inclination sensor 211 includes: a substrate 1, a case 2, a cover portion 3, light-receiving elements 4A, 4B, a light-emitting element 5, a rotator 6, a wiring pattern 7, and terminals 7a, 7b, 7c. The light-receiving elements 4A, 4B and the light-emitting element 5 are installed on the substrate 1. As shown in FIG. 5, the wiring pattern 7 is formed on a surface of the substrate 1. The wiring pattern 7, for example, includes copper. Further, in FIG. 3, FIG. 4, and FIG. 6, the cover portion 3 is not shown in the drawings.

The light-receiving elements 4A, 4B, for example, are PIN photodiodes. The light-receiving elements 4A, 4B each receive infrared rays and then produce current passing therethrough. The light-emitting element 5, for example, is an infrared ray light-emitting diode (LED) that emits infrared rays.

A gap portion 20 is formed in the case 2. The rotator 6 is accommodated in the gap portion 20. As shown in FIG. 3 and FIG. 5, the gap portion 20 includes: a rotator accommodating portion 20a, three window portions 20b, and an element accommodating portion 20c. The three window portions 20b are respectively formed corresponding to the light-receiving elements 4A, 4B and the light-emitting element 5. The rotator accommodating portion 20a is used for accommodating the rotator 6, and enabling the rotator 6 to rotate to a specified position corresponding to the gesture of the inclination sensor 211. As shown in FIG. 5, the element accommodating portion 20c is used for accommodating the light-receiving elements 4A, 4B and the light-emitting element 5.

The cover portion 3 blocks the case 2 to form the gap portion 20. As shown in FIG. 5, a reflecting film 30 is formed on a lower surface of the cover portion 3. The light emitted by the light-emitting element 5 is reflected by the reflecting film 30 towards the light-receiving elements 4A, 4B.

The rotator 6 rotates in the rotator accommodating portion 20a according to the gesture of the inclination sensor 211. Therefore, the light emitted by the light-emitting element 5 is prevented from reaching the light-receiving element 4A or the light-receiving element 4B.

FIG. 3 shows a standing gesture of the inclination sensor 211. The standing gesture corresponds to a horizontal state of the eyeglasses 200. In this case, the rotator 6 is located on a front surface of the light-emitting element 5. The infrared rays emitted by the light-emitting element 5 are blocked by the rotator 6, so that the light-receiving elements 4A, 4B cannot receive the infrared rays emitted from the light-emitting element 5.

As shown in FIG. 4, the inclination sensor 211 rotates clockwise, and is then inclined. In this case, the rotator 6 rotates towards a front surface of the light-receiving element 4B. As shown in FIG. 5, the infrared rays emitted from the light-emitting element 5 are reflected by the reflecting film 30 to the light-receiving element 4A. However, the light-receiving element 4B cannot receive the infrared rays emitted from the light-emitting element 5.

As shown in FIG. 6, when the inclination sensor 211 rotates 180° from the standing gesture, the inclination sensor 211 is inverted. At to this time, the rotator 6 is at a position opposite to that when the inclination sensor 211 is set to the standing gesture. The infrared rays emitted from the light-emitting element 5 are reflected by the reflecting film 30 to the light-receiving elements 4A, 4B.

The intensity of the signals output by the light-receiving elements 4A, 4B can change according to the rotation direction and the rotation angle of the inclination sensor 211. Therefore, the inclined angle of the eyeglasses 200 can be detected according to the intensity of the signals output by the light-receiving elements 4A, 4B.

The inclination sensor 211 is not limited to the sensor shown in FIG. 3 to FIG. 6. In an embodiment, an acceleration sensor or a gyro sensor can be applied to the inclination sensor 211.

Figure 7:
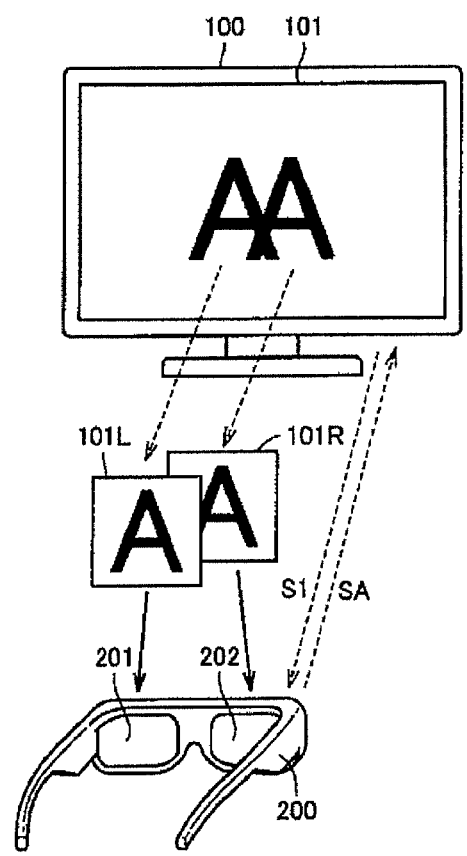
FIG. 7 is a diagram illustrating image display of the image system in Embodiment 1 in a first mode.

FIG. 7 is a diagram illustrating image display of the image system in Embodiment 1 in the first mode. Referring to FIG. 2 and FIG. 7, the eyeglasses 200 transmit the angle signal SA indicating the inclined angle of the eyeglasses 200 to the image display device 100. The eyeglasses 200 remain substantially horizontal. The image display device 100 receives the angle signal SA from the eyeglasses 200. The image display device 100 (the determining portion 114 shown in FIG. 2) determines that the inclined angle is in the predetermined range.

In this case, the display mode switching processing portion 111 sets the display mode of the image display device 100 to the first mode. Therefore, the display panel 101 alternately displays the left-eye image 101L and the right-eye image 101R. The image display device 100 (the transmitting portion 112) transmits the synchronizing signal S1 in synchronization with the left-eye image 101L and the right-eye image 101R to the eyeglasses 200.

The eyeglasses 200 change the states of the optical shutters 201, 202 according to the synchronizing signal S1. Specifically, when the display panel 101 displays the left-eye image 101L, the optical shutter adjusting portion 214 respectively sets the optical shutters 201, 202 to be open and closed. In another aspect, when the image display device 100 displays the right-eye image 101R, the optical shutter adjusting portion 214 sets the optical shutters 201, 202 to the opposite states. Thereby, the left-eye image 101L and the right-eye image 101R are respectively guided to the left eye and the right eye of the viewer. The viewer senses the analogical parallax through the left-eye image 101L and the right-eye image 101R. In this way, the viewer can view the images displayed by the image display device 100 as 3D images.

However, when the viewer adopts a different posture, the eyeglasses 200 can become greatly inclined from the horizontal direction, or eyeglasses can rotate from horizontal by about 90°. Further, when the viewer removes the eyeglasses 200, they can be placed the eyeglasses facing downwards or in a reverse direction.

In this case, the image display device 100 continuously displays the 3D images, that is, the left-eye image 101L and the right-eye image 101R, but it is difficult for the viewer to see the images properly. Therefore, in Embodiment 1, when the inclined angle exceeds the predetermined range, the image display device 100 (the display mode switching processing portion 111) switches the display mode from first mode to second mode.

Figure 8:
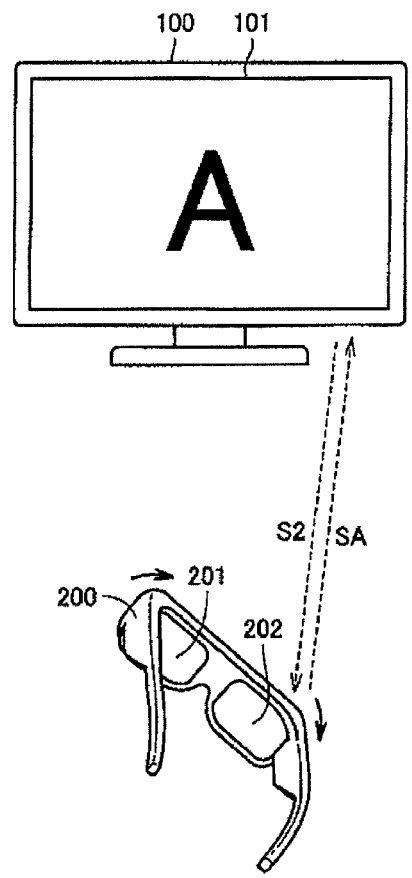
FIG. 8 is a diagram illustrating image display of the image system in Embodiment 1 in a second mode.

FIG. 8 is a diagram illustrating image display of the image system in Embodiment 1 in the second mode. In the second mode, the image display device 100 does not switch between the left-eye image 101L and the right-eye image 101R. Specifically, the image display device 100 displays 2D images.

In this case, according to the angle signal SA transmitted by the eyeglasses 200, the image display device 100 (the determining portion 114) determines that the inclined angle is outside the predetermined range. The display mode switching processing portion 111 sets the display mode of the image display device 100 to the second mode according to a determination result of the determining portion 114. The display panel 101 displays 2D images.

Moreover, the image display device 100 (the transmitting portion 112) transmits the mode signal S2 to the eyeglasses 200. The optical shutter adjusting portion 214 sets both the optical shutters 201, 202 to be open according to the mode signal S2. Therefore, 2D images are guided to both the left eye and the right eye of the viewer. Though the images displayed on the display panel 101 are changed from 3D images to 2D images, the viewer can continue wearing the eyeglasses 200 to view the images.

Figure 9:
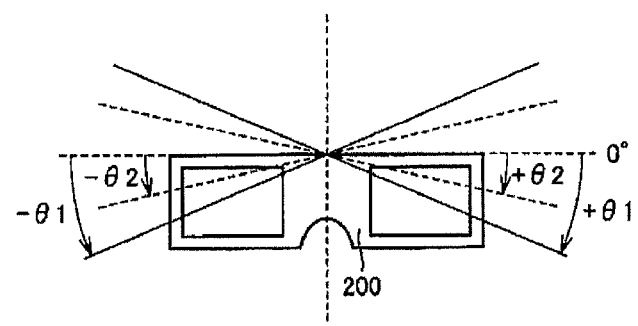
FIG. 9 is a diagram illustrating a range of an inclined angle.

FIG. 9 is a diagram illustrating a range of the inclined angle. Referring to FIG. 9, when the eyeglasses 200 are horizontal, the angle is 0°. A first range is defined as a range of the inclined angle in which the display mode is switched from the first mode to the second mode. The first range is a range of $-\theta 1$ to $+\theta 1$. That is, when the inclined angle deviates from the range of $-\theta 1$ to $+\theta 1$, the image display device 100 switches the display mode from the first mode to the second mode.

A second range is defined as a range of the inclined angle in which the display mode is switched from the second mode to the first mode. In an embodiment, the second range is consistent with the first range. That is, when the inclined angle is in the range of $-\theta 1$ to $+\theta 1$, the display mode is the first mode. In another aspect, when the inclined angle deviates from the range of $-\theta 1$ to $+\theta 1$, the display mode is the second mode.

In another embodiment, the second range is a range narrower than the range of $-\theta 1$ to $+\theta 1$. For example, as shown in FIG. 9, the second range is a range of $-\theta 2$ to $+\theta 2$.

When the images are being viewed, the inclined angle of the eyeglasses 200 continually changes. When the first range is consistent with the second range, the display mode can be frequently switched between the first mode and the second mode. When the second range is preset to be narrower than the first range, the above problem can be avoided.

The image display device 100 can immediately switch the display mode from the first mode to the second mode when the inclined angle of the eyeglasses 200 deviates from the first range. Alternatively, the image display device 100 can also switch the display mode from the first mode to the second mode when the time that the inclined angle of the eyeglasses 200 deviates from the first range reaches a specified limit. Therefore, the image display device 100 can actually detect that the inclined angle of the eyeglasses 200 is outside the first range. In another aspect, preferably, the display mode is immediately switched from the second mode to the first mode when the inclined angle of the eyeglasses 200 enters the second range. The display mode can immediately return from the second mode to the first mode. However, the display mode can also be switched after the inclined angle of the eyeglasses 200 enters the second range for a specified time. The time that the inclined angle is outside the first range and the time that the inclined angle is in the second range are determined by the determining portion 114 or the display mode switching processing portion 111.

In view of the above, according to Embodiment 1, the image display device 100 switches the display mode from the first mode to the second mode when the inclined angle of the eyeglasses 200 exceeds the predetermined range. The first mode alternately displays the left-eye image and the right-eye image. The second mode does not switch the left-eye image with the right-eye image, and specifically, is a mode for displaying 2D images. In the first mode, the eyeglasses 200 (the optical shutter adjusting portion 214) enable the optical shutters 201, 202 to alternately change between the open state and the closed state in synchronization with the left-eye image and the right-eye image. In another aspect, in the second mode, the eyeglasses 200 (the optical shutter adjusting portion 214) enable the optical shutters 201, 202 to maintain the open state.

According to Embodiment 1, for example, when the inclined angle of the eyeglasses 200 is in an appropriate range, the 3D images can be viewed. When the inclined angle of the eyeglasses 200 exceeds the range, though the images displayed on the image display device 100 are changed to 2D images, the viewer can continue observing the images. Moreover, 3D images can again be seen when the viewer returns to the appropriate posture. Therefore, the image display is controlled according to the state of the viewer.

[Embodiment 2]

Embodiment 1 illustrates the circumstance where only one person views the 3D images, that is, the action of the image system when only one pair of eyeglasses 200 is used. Embodiment 2 illustrates the action of the image display device 100 when multiple persons wear eyeglasses to view the 3D images.

Figure 10:
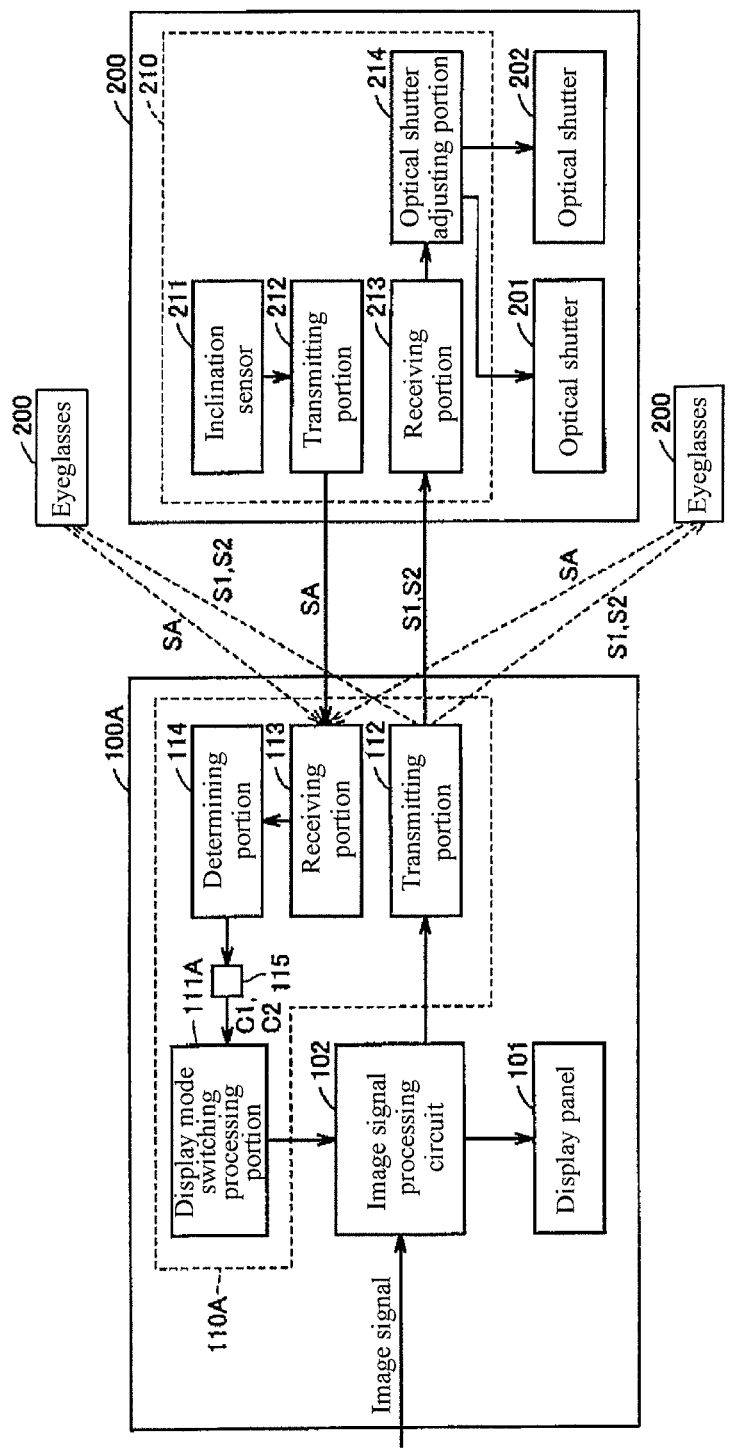
FIG. 10 is a block diagram illustrating the configuration of main parts of an image system in Embodiment 2.

FIG. 10 is a block diagram illustrating the configuration of main parts of the image system in Embodiment 2. Referring to FIG. 2 and FIG. 10, the image display device 100A in Embodiment 2 includes a control circuit 110A to replace the control circuit 110. Different from the control circuit 110, the control circuit 110A includes a display mode switching processing portion 111A to replace the display mode switching processing portion 111, and further includes a counter 115. The configuration of other parts of the image display device 100A is the same as the configuration of the corresponding parts of the image display device 100 in Embodiment 1, which will not be repeatedly described herein. Similar to Embodiment 1, the control circuit 110A can be implemented using a single semiconductor IC or multiple semiconductor ICs.

The receiving portion 113 receives the angle signals SA from multiple pairs of eyeglasses 200. The determining portion 114 determines whether the inclined angle of the eyeglasses 200 is in the predetermined to range according to the angle signal SA received by the receiving portion 113. The determining portion 114 determines whether the inclined angle of each of the multiple pairs of eyeglasses 200 is in the predetermined range. Therefore, the determining portion 114 generates the same number of determination results as the number of eyeglasses 200.

The counter 115 receives the determination results generated by the determining portion 114. The counter 115 counts according to the determination results the number of eyeglasses having the inclined angle in the predetermined range and the number of eyeglasses having the inclined angle outside the predetermined range. Further, the counter 115 can be a part of the determining portion 114, and can also be a part of the display mode switching processing portion 111A.

The counter 115 outputs a first value C1 and a second value C2 to the display mode switching processing portion 111. The first value C1 is the number of eyeglasses having the inclined angle in the predetermined range. The second value C2 is the number of eyeglasses having the inclined angle outside the predetermined range.

The display mode switching processing portion 111A switches the display mode between the first mode and the second mode according to the first value C1 and the second value C2. The transmitting portion 112 transmits the signal corresponding to the display mode (either the synchronizing signal S1 or the mode signal S2) to the multiple pairs of eyeglasses 200.

Since different observers view the images displayed on the image display device 100A in different postures, the inclined angles of the multiple pairs of eyeglasses 200 are different from each other. However, when the image display device 100A displays the images, the image display device 100A must select either the first mode or the second mode. Three selection options applicable to Embodiment 2 are illustrated below.

(First Option)

Figure 11:
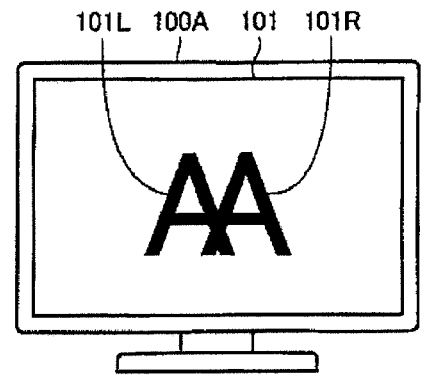
FIG. 11 is a diagram illustrating an option in which an image display device in FIG. 10 selects a display mode.
Figure 11:
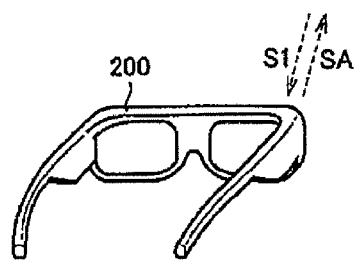
Figure 11:
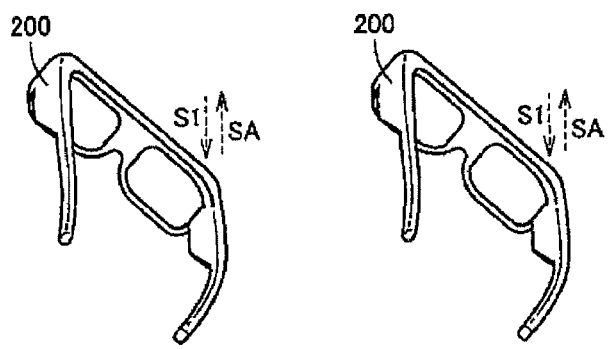

FIG. 11 is a diagram illustrating an option in which the image display device in FIG. 10 selects a display mode. Referring to FIG. 11, the inclined angle of one of three pairs of eyeglasses 200 is in the predetermined range. In the first option, when the inclined angle of at least one of the multiple pairs of eyeglasses 200 is in the predetermined range, the image display device 100A selects the first mode as the display mode. Therefore, the left-eye image 101L and the right-eye image 101R are displayed on the display panel 101. Moreover, the synchronizing signal S1 is output from the image display device 100A.

Specifically, the image display device 100A receives the angle signals SA transmitted from the three pairs of eyeglasses 200. The determining portion 114 shown in FIG. 10 determines whether the inclined angles of the three pairs of eyeglasses 200 are in the predetermined range. The counter 115 generates the first value C1 and the second value C2 according to the determination results of the determining portion 114. The display mode switching processing portion 111A selects the first mode when the first value C1 is greater than 1. According to the first option, viewers can view 3D images when in the appropriate posture.

(Second Option)

Figure 12:
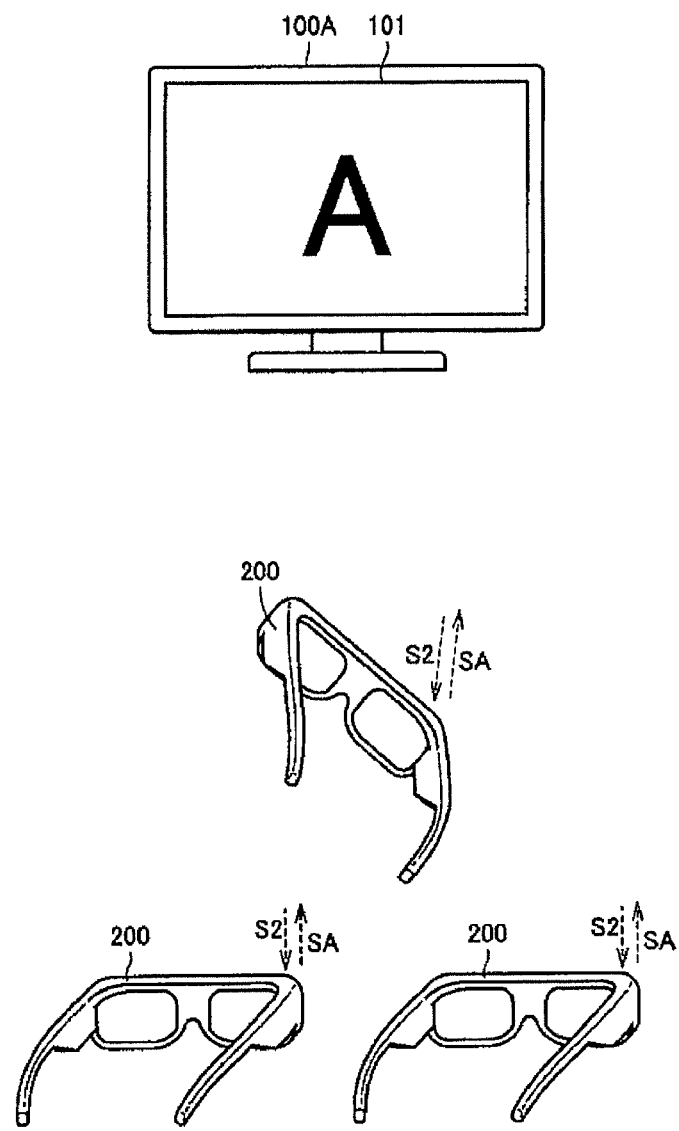
FIG. 12 is a diagram illustrating another option in which the image display device in FIG. 10 selects a display mode.

FIG. 12 is a diagram illustrating another option in which the image display device in FIG. 10 selects a display mode. Referring to FIG. 12, the inclined angle of one of the three pairs of eyeglasses 200 exceeds the predetermined range. In the second option, when the inclined angle of at least one of the multiple pairs of eyeglasses 200 is outside the predetermined range, the image display device 100A selects the second mode as the display mode. Therefore, 2D images are displayed on the display panel 101. Moreover, the mode signal S2 is output from the image display device 100A.

Specifically, the image display device 100A receives the angle signals SA transmitted from the three pairs of eyeglasses 200. Through the same processing as in the first option, the first value C1 and the second value C2 are generated. The display mode switching processing portion 111A selects the second mode when the second value C2 is greater than 1.

According to the second option, viewers in a reclined posture are not permitted to view 3D images. Therefore, the viewers can appropriately view the images.

(Third Option)

In the third option, the display mode switching processing portion 111A compares the first value C1 with the second value C2. The display mode switching processing portion 111A selects the first mode when the first value C1 is greater than the second value C2; otherwise, the second mode is selected.

When the first value C1 is the same as the second value C2, the display mode switching processing portion 111A selects a predetermined mode. The mode can be either the first mode or second mode. The selection of first mode or second mode can be preset. Alternatively, the viewer can operate the image display device 100A to determine which of the two modes is selected.

Moreover, when only one pair of eyeglasses 200 is in use, the actions corresponding to the first to third options are the same as the action of the image display device 100 in Embodiment 1.

Merely one of the first to third options can be applied to the image display device 100A. Alternatively, the first and second options, or the first to third options can also be applied to the image display device 100A. In this case, the viewer can operate the image display device 100A to select the required option. Specifically, for example, the display mode switching processing portion 111A pre-stores the first and second options or the first to third options. When the viewer operates the image display device 100A, the display mode switching processing portion 111A selects the option corresponding to the operation of the viewer from the multiple options.

The image display device 100A can also be configured as specific eyeglasses 200 that transmit the angle signals SA. Therefore, the image display device 100A can determine whether the multiple pairs of eyeglasses 200 transmit the angle signals SA to the image display device 100A. For example, when communicating with the multiple pairs of eyeglasses 200, the image display device 100A sets codes for identifying the multiple pairs of eyeglasses 200, and transmits the codes to the multiple pairs of eyeglasses 200. When the multiple pairs of eyeglasses 200 transmit the angle signals, the eyeglasses 200 carry the respective codes in the angle signals. Therefore, when receiving the angle signals, the image display device 100A can be the specific eyeglasses 200 that transmit the angle signals. However, the method for the image display device 100A to identify the multiple pairs of eyeglasses 200 is not limited herein.

In view of the above, according to Embodiment 2, the image display device receives the angle signals individually transmitted by the multiple pairs of eyeglasses. The image display device sets the display mode to the first mode or the second mode according to the angle signals. According to Embodiment 2, when the multiple viewers observe images displayed on one image display device, the intention of the viewers to view 3D images can be best satisfied (the first mode is selected). Alternatively, the intention of the viewers to continue viewing the images while adopting a preferred posture can be best satisfied (the second mode is selected).

[Embodiment 3]

Figure 13:
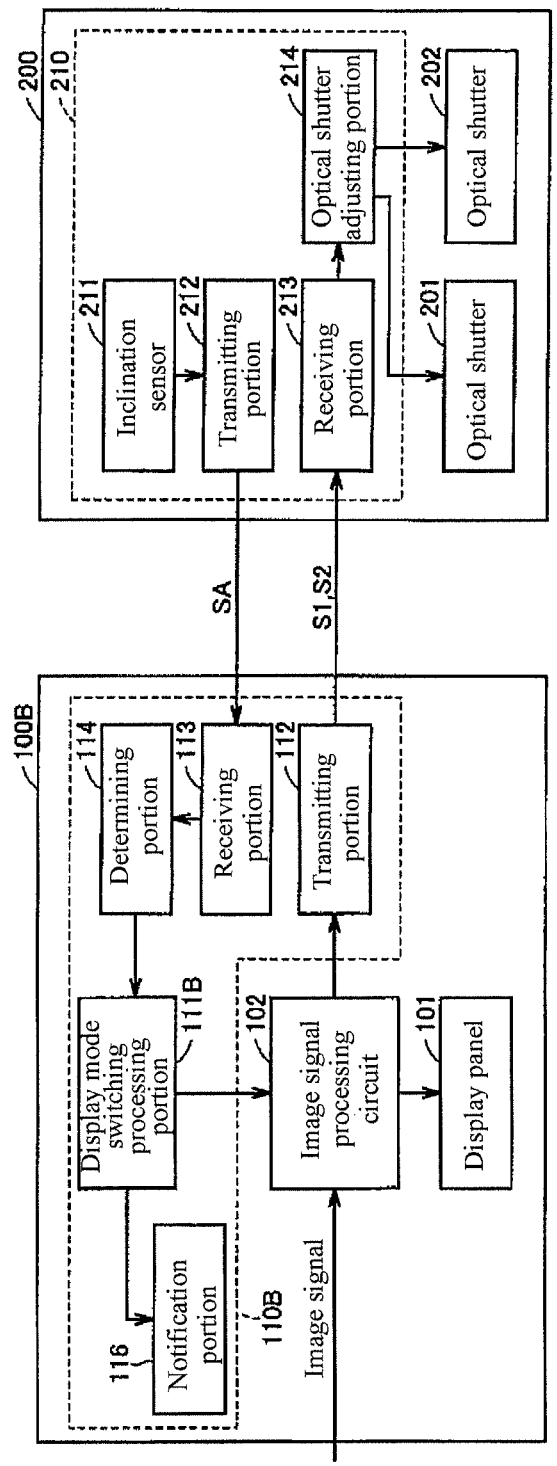
FIG. 13 is a block diagram illustrating the configuration of main parts of an image system in Embodiment 3.

In Embodiment 3, a message notifies the viewer that the display mode has been changed. FIG. 13 is a block diagram illustrating the configuration of the main parts of the image system in Embodiment 3.

Referring to FIG. 2 and FIG. 13, the image display device 100B in Embodiment 3 includes a control circuit 110B to replace the control circuit 110. Different from the control circuit 110, the control circuit 110B includes a display mode switching processing portion 111B to replace the display mode switching processing portion 111, and further includes a notification portion 116. The configuration of other parts of the image display device 100B is the same as the configuration of the corresponding parts of the image display device 100 in Embodiment 1, which will not be repeatedly described herein. Similar to Embodiment 1, the control circuit 110B can be implemented using a single semiconductor IC or multiple semiconductor ICs.

The display mode switching processing portion 111B selects either the first mode or the second mode as the display mode according to the determination result of the determining portion 114. When selecting the second mode, the display mode switching processing portion 111B transmits a signal indicating the second mode to the notification portion 116. The notification portion 116 notifies the viewer of the second mode according to the signal from the display mode switching processing portion 111B.

Configuration of other parts of the image display device 100B is the same as the configuration of the corresponding parts of the image display device 100, which will not be repeatedly described herein.

Figure 14:
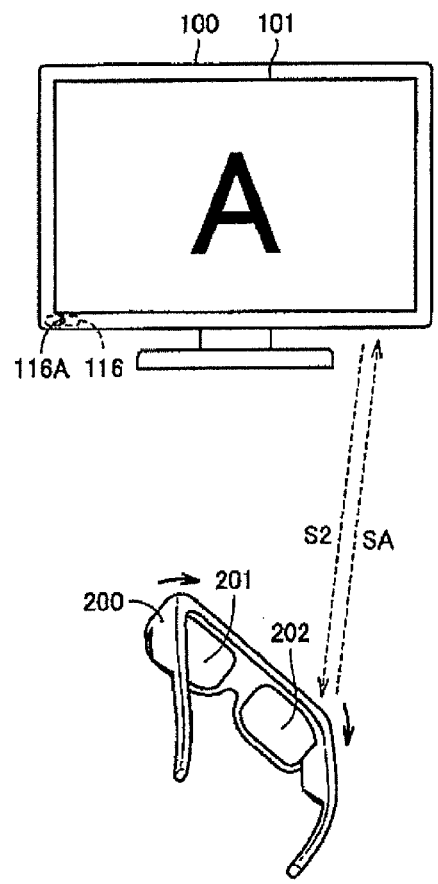
FIG. 14 is a diagram illustrating a notification example of the second mode.

FIG. 14 is a diagram illustrating a notification example of the second mode. Referring to FIG. 14, the notification portion 116 includes a light-emitting element 116A (for example, an LED). In the second mode, the notification portion 116 turns on the light-emitting element.

Figure 15:
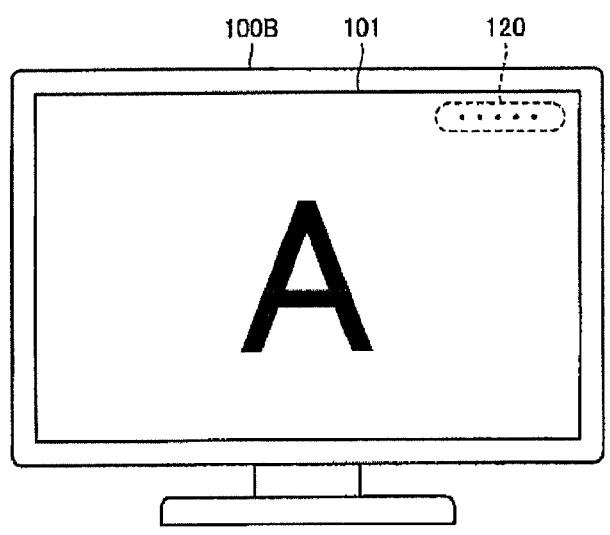
FIG. 15 is a diagram illustrating another notification example of the second mode.

FIG. 15 is a diagram illustrating another notification example of the second mode. Referring to FIG. 15, a picture 120 indicating the second mode is displayed on a specified position of the display panel 101. The picture 120 can include characters, marks, graphics and any combination thereof. In this example, the notification portion 116 outputs to the image signal processing circuit 102 a signal for displaying the picture 120 on the display panel 101. The image signal processing circuit 102 enables the display panel 101 to display the picture 120 according to the signal from the notification portion 116.

Figure 16:
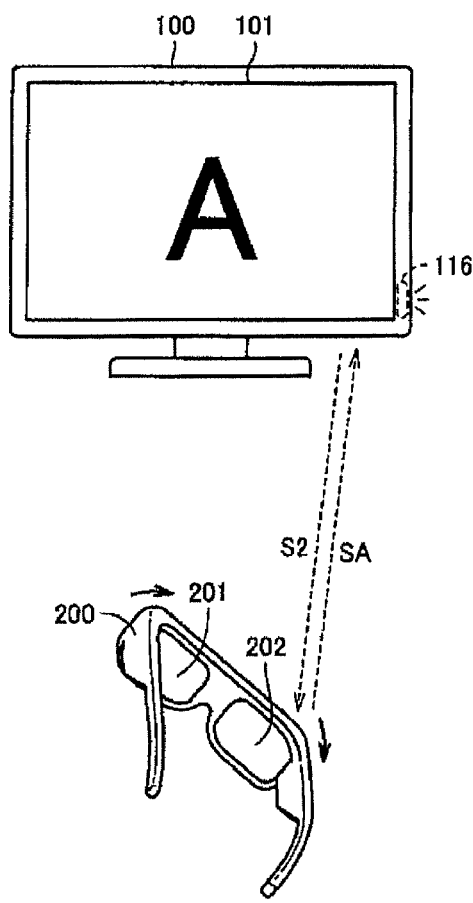
FIG. 16 is a diagram illustrating still another notification example of the second mode.

FIG. 16 is a diagram illustrating still another notification is example of the second mode. Referring to FIG. 16, the notification portion 116 makes an announcement. The time and frequency of making the announcement, the duration of the announcement, the cycle of generating the announcement and other conditions are not particularly limited.

Figure 17:
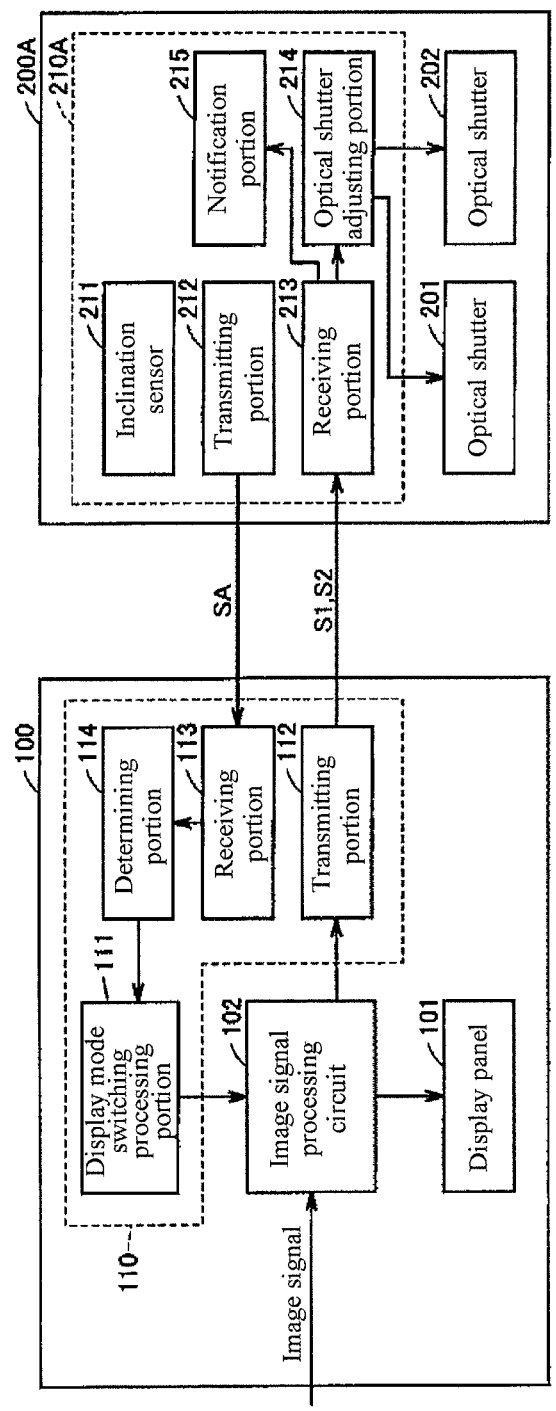
FIG. 17 is a diagram illustrating a variation embodiment of the image system in Embodiment 3.

FIG. 17 is a diagram illustrating a variation embodiment of the image system in Embodiment 3. Referring to FIG. 2 and FIG. 17, different from the eyeglasses 200, the eyeglasses 200A employ a control circuit 210A instead of the control circuit 210. Different from the control circuit 210, the control circuit 210A further includes a notification portion 215. The configuration of other parts of the eyeglasses 200A is the same as the configuration of the corresponding parts of the eyeglasses 200, which will not be repeatedly described herein. Similar to Embodiment 1, the control circuit 210A can be implemented using a single semiconductor IC or multiple semiconductor ICs.

In the variation embodiment, the eyeglasses 200A notify the viewer of the second mode. Specifically, the notification portion 215 receives the synchronizing signal S1 and the mode signal S2 through the receiving portion 213 from the image display device 100. When receiving the mode signal S2, the notification portion 215 notifies the viewer of the second mode. For example, the notification portion 215 makes a sound.

In the embodiment, the viewer is notified by a message that the display mode is the second mode. Alternatively, the message can indicate that the display mode is the first mode.

The notification portion 116 can be applied in the image display device 100A in Embodiment 2. Alternatively, the eyeglasses 200 in Embodiment 2 can be replaced with the eyeglasses 200A in Embodiment 3.

The notification portion is not limited to being provided in either the image display device or the eyeglasses. The notification portion can alternatively be provided in both the image display device and the eyeglasses. In this case, for example, the notification portion of the image display device emits light, and the notification portion of the eyeglasses makes a sound.

In view of the above, Embodiment 3 can achieve the effect of Embodiment 1. In addition, according to Embodiment 3, the viewer is informed of the display mode selected by the image display device.

[Embodiment 4]

In the foregoing embodiments, when the display mode is the second mode, the image display device displays 2D images. The image display processing in the second mode in Embodiment 4 is different from that in Embodiments 1 to 3. The configuration of the image display device in any of Embodiments 1 to 3 is applicable to the configuration of the image display device in Embodiment 4. Similarly, the configuration of the eyeglasses in any of Embodiments 1 to 3 is applicable to the configuration of the image display device in Embodiment 4. The image display processing in Embodiment 4 is illustrated with reference to the configuration shown in FIG. 1 and FIG. 2.

Figure 18:
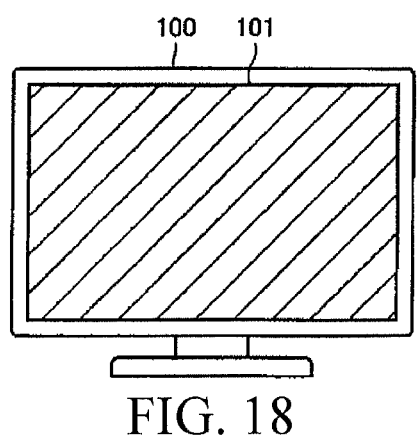
FIG. 18 is a diagram of an example illustrating image display processing in Embodiment 4.

FIG. 18 is a diagram of an example illustrating image display processing in Embodiment 4. Referring to FIG. 18, when the inclined angle of the eyeglasses 200 exceeds the predetermined range, the image display device 100 stops to display image. In this case, for example, a background color (for example, blue) is displayed on the display panel 101.

In another example, when the inclined angle of the eyeglasses 200 exceeds the predetermined range, the image display device 100 temporarily stops the image switching. In this case, any or both of the left-eye image 101L and the right-eye image 101R remain displayed.

Referring to FIG. 1, for example, the image display device 100 transmits a control signal through the cable 302 to the disc regeneration device 300. The disc regeneration device 300 stops the image regeneration or temporarily stops the image switching according to the control signal.

When the eyeglasses 200 recover from the inclined state to the horizontal state, the display mode becomes the first mode. In this case, similar to Embodiments 1 to 3, the image display device 100 alternately displays the left-eye image 101L and the right-eye image 101R. Specifically, the image display device 100 transmits the control signal through the cable 302 to the disc regeneration device 300. The control signal is a signal indicating the image regeneration. The disc regeneration device 300 reprocesses according to the control signal.

In view of the above, according to Embodiment 4, the 3D images cannot be viewed when the eyeglasses are inclined (the viewer is in a reclined posture). Therefore, the viewer can pay attention to the appropriate posture for viewing the 3D images. Perhaps it is capable of preventing the viewer from viewing the 3D images.

In addition, in the embodiment, the determining portion that determines whether the inclined angle of the eyeglasses 200 is in the predetermined range is provided in the image display device. However, the invention is not limited to such determination being made by a component located in the image display device.

Figure 19:
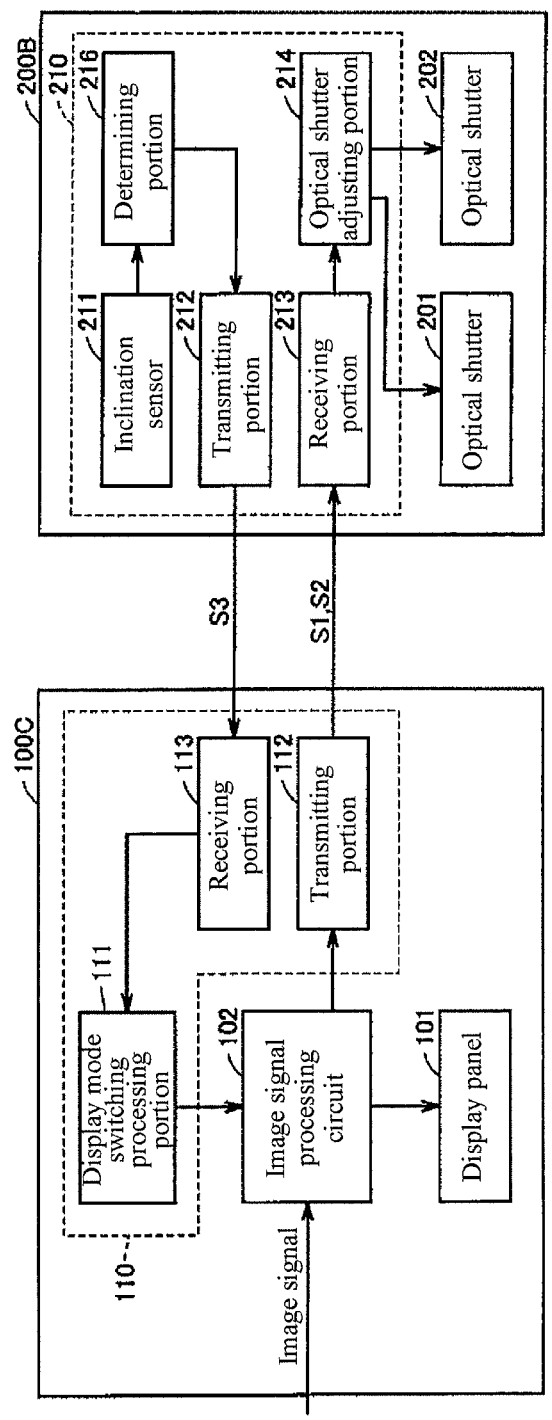
FIG. 19 is a diagram of an alternative embodiment of the invention.

FIG. 19 is a diagram of a variation of the embodiment of the invention. Referring to FIG. 1 and FIG. 19, different from the image display device 100, the image display device 100C does not include the determining portion 114. Different from the eyeglasses 200, the eyeglasses 200B further include a determining portion 216. The function of the determining portion 216 is the same as that of the determining portion 114. In this case, the transmitting portion 212 of the eyeglasses 200B transmits a signal S3 indicating a determination result of the determining portion 216. The display mode switching processing portion 111 receives the signal S3 through the receiving portion 113. The processing of the display mode switching processing portion 111 will not be repeatedly described herein.

The determining portion 114 can be omitted from the image display device 100A of Embodiment 2 or the image display device 100B of Embodiment 3. In this case, the eyeglasses 200B can be used instead of the eyeglasses 200. The determining portion 216 can be provided in the eyeglasses 200A. Alternatively, the notification portion 215 can be provided in the eyeglasses 200B.

Further, in the embodiment, the 3D images are displayed in a manner such that the left-eye image and the right-eye image are alternately displayed. However, the 3D images can also be displayed in other manners. In this case, the second mode is a mode capable of displaying 2D images. Alternatively, as shown in Embodiment 4, the second mode can also be a mode capable of stopping image regeneration.

For example, the invention is also applicable to a manner in which two polarizing lenses having different polarization directions are used as the left-eye portion and the right-eye portion of the eyeglasses for viewing 3D images. In this case, in the first mode, the image display device displays two images having different polarization directions on the display panel. In the second mode, for example, the image display device displays on the display panel 2D images polarizing in a center direction of the polarization direction of the polarizing lens used as the left-eye portion of the eyeglasses and the polarization direction of the polarizing lens used as the right-eye portion of the eyeglasses. Therefore, the invention is not limited to the specified display manner of the 3D images.

In addition, when the 3D images corresponding to various inclined angles of the eyeglasses (for example, rightward by 45°, rightward by 90°, leftward by 45°, and leftward by 90°), that is, multiple 3D images corresponding to various view points having been recorded in the medium, the image display device can also implement the subsequent image processing. That is, the image display device selects an optimal image from multiple 3D images according to the inclined angle of the eyeglasses, and displays images corresponding to the selected image. For example, when the eyeglasses rotate rightward by 90° (or leftward by 90°), the image display device displays the image corresponding to the eye located above and the image corresponding to the eye located below. When the eyeglasses rotate rightward by 45°, the image display device displays the image corresponding to the left eye located above and the image corresponding to the right eye located below. When the eyeglasses rotate leftward by 45°, different from the foregoing situation, the image display device displays the image corresponding to the right eye located above and the image corresponding to the left eye located below. That is, the image display device determines the images to be viewed by the left eye and the right eye according to the position of the left eye and the right eye of the viewer wearing the eyeglasses. Therefore, 3D rotation, that is, rotation of 3D images, can be implemented. Taking the inclined angle as an example, whenever the inclined angle changes by 30°, the image display device changes the 3D images viewed by the viewer. In addition, the image display device can change the 3D images not only according to the inclined angles in the left and right directions, but also according to the inclined angles in the upper and lower direction.

While several embodiments of the present invention have been illustrated and described, various modifications and improvements can be made by those skilled in the art. The embodiments of the present invention are therefore described in an illustrative but not in a restrictive sense. It is intended that the present invention should not be limited to the particular forms as illustrated and that all modifications which maintain the spirit and scope of the present invention are within the scope defined in the appended claims.

What is claimed is:

1. A control system, for controlling an image system, wherein the image system comprises an image display device for displaying 3D images containing a left-eye image and a right-eye image, and at least one eyeglasses for viewing the 3D images;

the image display device alternately displays the left-eye image and the right-eye image;

the at least one eyeglasses comprising:
a first optical shutter and a second optical shutter respectively disposed corresponding to the left-eye image and the right-eye image; and
a first control circuit comprising:
a sensor configured to detect an amount of an inclined angle of the at least one eyeglasses with respect to a horizontal direction; and
a transmitter configured to transmit a first signal indicating the amount of the inclined angle to the image display device, the transmission being executed regardless of the amount of the inclined angle detected by the sensor;

the image display device comprising a second control circuit comprising:
a receiver configured to receive the first signal;
a determinator configured to recognize the amount of the inclined angle indicated by the first signal received by the receiver and determine whether the amount of the inclined angle exceeds a first range according to the amount of the inclined angle indicated by the first signal; and
a mode switcher configured to switch an action mode of the image display device between a first mode and a second mode
based on a determination result of the determinator;

wherein the first mode alternately displays the left-eye image and the right-eye image, the second mode does not switch the left-eye image with the right-eye image; and the first control circuit further comprises an optical shutter adjuster, configured when in the first mode to respectively open and close the first and second optical shutters in synchronization with the display of the left-eye image and the right-eye image, and in the second mode, to open both the first and second optical shutters.

2. The control system according to claim 1, wherein the second mode enables the image display device to display 2D images.

3. The control system according to claim 1, wherein the at least one pair of eyeglasses are multiple pairs of eyeglasses; when the multiple pairs of eyeglasses comprise at least one pair of first eyeglasses having the inclined angle in the first range and at least one pair of second eyeglasses having the inclined angle outside the first range, the mode switcher selects either the first or second mode according to a specified selection condition.

4. The control system according to claim 3, wherein the specified selection condition is a condition of selecting the first mode.

5. The control system according to claim 3, wherein the specified selection condition is a condition of selecting the second mode.

6. The control system according to claim 3, wherein the specified selection condition is a condition of selecting a mode corresponding to the at least one pair of first eyeglasses or the at least one pair of second eyeglasses being greater in number relative to the other.

7. The control system according to claim 6, wherein the specified selection condition comprises a condition of selecting any of the first and second modes when the number of the at least one pair of first eyeglasses is the same as that of the at least one pair of second eyeglasses.

8. The control system according to claim 1, wherein the mode switcher switches the action mode from the second mode to the first mode when the inclined angle is in a second range; and the second range is narrower than the first range.

9. The control system according to claim 1, wherein the mode switcher switches the action mode from the second mode to the first mode when the inclined angle is in a second range; and the second range is the same as the first range.

10. The control system according to claim 1, wherein either the first control circuit or the second control circuit further comprises a notifier configured to notify a viewer the action mode selected by the mode switcher.

11. The control system according to claim 10, wherein the notifier comprises a light-emitting element.

12. The control system according to claim 10, wherein the notifier is configured to make a sound.

13. The control system according to claim 1, wherein the second mode enables the switching between the left-eye image and the right-eye image to stop.

14. The control system according to claim 1, wherein the second mode enables the image display device to stop displaying image.

15. A control device, installed in an eyeglasses for viewing 3D images containing a left-eye image and a right-eye image displayed by an image display device;

the eyeglasses comprises a first optical shutter and a second optical shutter respectively disposed corresponding to the left-eye image and the right-eye image; and the control device comprising a control circuit comprising:
a sensor, configured to detect an amount of an inclined angle with respect to a horizontal direction of the eyeglasses;
a transmitter, configured to transmit a first signal indicating the amount of the inclined angle detected by the sensor to the image display device regardless of the amount of the inclined angle;
a receiver, configured to receive from the image display device a second signal specifying an action mode selected by the image display device; and
an optical shutter adjuster, configured to adjust the first and second optical shutters in response to the second signal received by the receiver;

wherein the image display device recognizes the amount of the inclined angle indicated by the first signal, determines whether the amount of the inclined angle exceeds a first range, and switches the action mode between a first mode and a second mode based on a determination result, wherein the first mode alternately displays the left-eye image and the right-eye image and the second mode does not switch the left-eye image with the right-eye image; and the optical shutter adjuster is configured when in the first mode to respectively open and close the first and second optical shutters in synchronization with the display of the left-eye image and the right-eye image, and in the second mode, to open both the first and second optical shutters.

16. The control device according to claim 15, wherein the second mode enables the image display device to display 2D images.

17. The control device according to claim 15, wherein the second mode enables the switching between the left-eye image and the right-eye image to stop.

18. The control device according to claim 15, wherein the second mode enables the image display device to stop displaying image.

19. A control device, installed in an image display device for displaying 3D images containing a left-eye image and a right-eye image, the control device comprising a control circuit comprising:
- a receiver, configured to receive an angle signal indicating an amount of an inclined angle transmitted from at least one eyeglasses for viewing the 3D images regardless of the amount of the inclined angle with respect to a horizontal direction of the at least one eyeglasses, wherein at least one pair of at least one eyeglasses comprises a first optical shutter and a second optical shutter respectively disposed corresponding to the left-eye image and the right-eye image, and the first and second optical shutters are respectively configured to be synchronized with the display of the corresponding images;
- a determinator, configured to recognize the amount of the inclined angle indicated by the angle signal received from the glasses and determine whether the inclined angle exceeds a first range; and
- a mode switcher, configured to switch an action mode of the image display device between a first mode and a second mode based on a determination result of the determinator,
- wherein the first mode alternately displays the left-eye image and the right-eye image,
- the second mode does not switch the left-eye image with the right-eye image; and
- the control circuit further comprises a transmitter, configured to transmit a first signal synchronized with the display of the left-eye image and the right-eye image to the eyeglasses when in the first mode, and in the second mode, to transmit a second signal of setting both the first and second optical shutters to be open to the eyeglasses.

20. The control device according to claim 19, wherein the second mode enables the image display device to display 2D images.

21. The control device according to claim 19, wherein the at least one pair of eyeglasses are multiple pairs of eyeglasses; when the multiple pairs of eyeglasses comprise at least one pair of first eyeglasses having the inclined angle in the first range and at least one pair of second eyeglasses having the inclined angle outside the first range, the mode switcher selects any of the first and second modes according to a specified selection condition.

22. The control device according to claim 21, wherein the specified selection condition is a condition of selecting the first mode.

23. The control device according to claim 21, wherein the specified selection condition is a condition of selecting the second mode.

24. The control device according to claim 21, wherein the specified selection condition is a condition of selecting a mode corresponding to the at least one pair of first eyeglasses or the at least one pair of second eyeglasses being greater in number relative to the other.

25. The control device according to claim 24, wherein the specified selection condition comprises a condition of selecting any of the first and second modes when the number of the at least one pair of first eyeglasses is the same as that of the at least one pair of second eyeglasses.

26. The control device according to claim 19, wherein the mode switcher switches the action mode from the second mode to the first mode when the inclined angle is in a second range; and the second range is narrower than the first range.

27. The control device according to claim 19, wherein the mode switcher switches the action mode from the second mode to the first mode when the inclined angle is in a second range; and the second range is the same as the first range.

28. The control device according to claim 19, the control circuit further comprising a notifier configured to notify a viewer the action mode selected by the mode switcher.

29. The control device according to claim 28, wherein the notifier comprises a light-emitting element.

30. The control device according to claim 28, wherein the notifier is configured to make a sound.

31. The control device according to claim 19, wherein the second mode enables the switching between the left-eye image and the right-eye image to stop.

32. The control device according to claim 19, wherein the second mode enables the image display device to stop displaying image.

33. An eyeglasses, for viewing 3D images containing a left-eye image and a right-eye image displayed by an image display device,
- wherein the image display device is configured to switch an action mode of the image display device from a first mode to a second mode when an amount of an inclined angle of the eyeglasses exceeds a specified range with respect to a horizontal direction;
- the first mode alternately displays the left-eye image and the right-eye image, and the second mode does not switch the left-eye image with the right-eye image; and
- the eyeglasses comprising:
- a first optical shutter and a second optical shutter, respectively disposed corresponding to the left-eye image and the right-eye image; and
- a controller, configured to control the first and second optical shutters and comprising a control circuit comprising:
  - a sensor, configured to detect the amount of the inclined angle of the eyeglasses;
  - a transmitter, configured to transmit a first signal indicating the amount of the inclined angle detected by the sensor to the image display device regardless of the amount of the inclined angle;
  - a receiver, configured to receive from the image display device a specific second signal of the action mode selected by the image display device; and
  - an optical shutter adjuster, configured to adjust the first and second optical shutters in response to the second signal received by the receiver;
- wherein the image display device recognizes the amount of the inclined angle indicated by the first signal transmitted from transmitter, determines whether the amount of the inclined angle exceeds a first range, and switches the action mode based on a determination result, and
- the optical shutter adjuster is configured to respectively open and close the first and second optical shutters in synchronization with the display of the left-eye image and the right-eye image when in the first mode, and in the second mode, to open both the first and second optical shutters.

34. An image display device, comprising:
- a display, configured to alternately display a left-eye image and a right-eye image;

a control circuit comprising:
- a determininator, configured to recognize an amount of the inclined angle indicated by the first signal transmitted from of an eyeglasses for viewing the left-eye image and the right-eye image regardless of the amount of the inclined angle with respect to a horizontal direction of the eyeglasses, and determine whether the amount of the inclined angle exceeds a specified range; and
- a mode switcher, configured to switch a display mode of the display between a first mode and a second mode based on a determination result of the determinator, wherein the first mode is alternately displays the left-eye image and the right-eye image, and the second mode does not switch the left-eye image with the right-eye image;

the eyeglasses comprise a first optical shutter and a second optical shutter respectively disposed corresponding to the left-eye image and the right-eye image, and the first and second optical shutters are respectively configured to be synchronized with the display of the corresponding images;

wherein the control circuit of the image display device further comprises:
- a transmitter, configured to transmit a first signal synchronized with the display of the left-eye image and the right-eye image to the eyeglasses when in the first mode, and in the second mode, to transmit a second signal indicating the second mode to the eyeglasses.

35. An image system, wherein the image system comprises an image display device for displaying 3D images containing a left-eye image and a right-eye image, and at least one eyeglasses for viewing the 3D images;

the eyeglasses comprising:
- a first optical shutter, disposed corresponding to the left-eye image;
- a second optical shutter, disposed corresponding to the right-eye image;
- a first control circuit comprising:
  - a sensor, configured to detect an amount of an inclined angle with respect to a horizontal direction of the eyeglasses; and
  - a transmitter, configured to transmit an inclined information signal indicating the amount of the inclined angle detected by the sensor regardless of the amount of the inclined angle;

the image display device comprising a second control circuit comprising:
- a receiver, configured to receive the inclined information signal;
- a determinator, configured to recognize the amount of the inclined angle indicated by the inclined information signal received by the receiver and determine whether the amount of the inclined angle exceeds a first range; and
- a mode switcher, configured to switch an action mode between a first mode and a second mode based on a determination result of the determinator.

36. The image system according to claim 35, wherein the first mode displays the 3Dimages by alternately displaying the left-eye image and the right-eye image; and the second mode displays 2D images without alternately displaying the left-eye image and the right-eye image.

37. The image system according to claim 36, the eyeglasses further comprises an optical shutter adjuster, configured to adjust opening and closing of the first optical shutter and the second optical shutter respectively based on amount of the inclined angle;

when the first mode is selected by the determinator, the optical shutter adjuster to respectively open and close the first optical shutter and second optical shutter in synchronization with the display of the left-eye image and the right-eye image; and when the second mode is selected by the determinator, the optical shutter adjuster to open both the first optical shutter and second optical shutter.

38. The image system according to claim 35, wherein the image system comprises a plurality of the eyeglasses;

the mode switcher selects either the first mode or the second mode according to a specified selection condition based on the number of the eyeglasses whose the amount of the inclined angle exceeds a first angle in the purality of the eyeglasses.

39. The image system according to claim 38, wherein the mode switcher selects the second mode when the amount of the inclined angle of at least one eyeglasses of the plurality of eyeglasses exceeds the first angle.

40. The image system according to claim 35, wherein either the first control circuit or the second control circuit further comprises a notifier that notifies the viewer the selected mode selected by the mode switcher.

* * * * *